(12) United States Patent
Mohammad et al.

(10) Patent No.: US 10,558,412 B2
(45) Date of Patent: Feb. 11, 2020

(54) CONTENT DELIVERY NETWORK INCLUDING MOBILE DEVICES

(71) Applicant: HEWLETT-PACKARD DEVELOPMENT COMPANY, L.P., Houston, TX (US)

(72) Inventors: Nassir Mohammad, Bristol (GB); Joshua Serratelli Schiffman, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/084,262

(22) PCT Filed: Dec. 7, 2016

(86) PCT No.: PCT/US2016/065385
§ 371 (c)(1),
(2) Date: Sep. 12, 2018

(87) PCT Pub. No.: WO2018/106227
PCT Pub. Date: Jun. 14, 2018

(65) Prior Publication Data
US 2019/0073175 A1     Mar. 7, 2019

(51) Int. Cl.
*G06F 3/12* (2006.01)
*G06F 21/34* (2013.01)
(Continued)

(52) U.S. Cl.
CPC .......... *G06F 3/1293* (2013.01); *G06F 3/1222* (2013.01); *G06F 3/1238* (2013.01);
(Continued)

(58) Field of Classification Search
CPC .... G06F 3/1293; G06F 3/1238; G06F 3/1222; G06F 3/1292; G06F 21/34; G06F 21/10; H04L 67/1091; H04L 63/0442; H04L 67/1095; H04L 67/104; H04W 4/70
See application file for complete search history.

(56) References Cited

U.S. PATENT DOCUMENTS

| 6,924,906 B1 | 8/2005 | Schwier et al. |
| 9,117,164 B2 | 8/2015 | Park |

(Continued)

FOREIGN PATENT DOCUMENTS

| WO | 2013123445 A1 | 8/2013 |
| WO | 2015105658 A1 | 7/2015 |

OTHER PUBLICATIONS

"Enterprise Document Management Paper Smart Offices", Retrieved from Internet—https://www.pcquest.com/enterprise-document-management-paper-smart-offices/, Jul. 1, 2010, 7 pages.

(Continued)

*Primary Examiner* — Neil R McLean
(74) *Attorney, Agent, or Firm* — HP Inc. Patent Department (57) ABSTRACT

Examples disclosed herein relate to a content delivery network including a first and second mobile device. In one implementation, a peer to peer connection is established between a first and second mobile device to create a content delivery network. At least one of the mobile devices in the content delivery network may store content. In response to a request to render content, at least one of the mobile devices in the content delivery network may transmit the content to cause a content delivery device to render the content.

13 Claims, 6 Drawing Sheets

(51) Int. Cl.
  *G06F 21/10*  (2013.01)
  *H04L 29/06*  (2006.01)
  *H04L 29/08*  (2006.01)
  *H04W 4/70*  (2018.01)

(52) U.S. Cl.
  CPC ............ *G06F 3/1292* (2013.01); *G06F 21/10* (2013.01); *G06F 21/34* (2013.01); *H04L 63/0442* (2013.01); *H04L 67/1091* (2013.01); *H04L 67/104* (2013.01); *H04L 67/1095* (2013.01); *H04W 4/70* (2018.02)

(56) References Cited

U.S. PATENT DOCUMENTS

| | | | |
|---|---|---|---|
| 2004/0064511 | A1 | 4/2004 | Abdel-Aziz et al. |
| 2010/0250704 | A1* | 9/2010 | Kittel .................. G06F 21/10 |
| | | | 709/219 |
| 2013/0095753 | A1* | 4/2013 | Chen .................. H04W 76/10 |
| | | | 455/41.1 |
| 2013/0219516 | A1 | 8/2013 | Shimshoni |
| 2013/0316682 | A1* | 11/2013 | Vieira .................. H04W 12/08 |
| | | | 455/414.1 |
| 2013/0332533 | A1 | 12/2013 | Ramankrishnan et al. |
| 2015/0178609 | A1 | 6/2015 | Marquardt et al. |
| 2018/0096261 | A1* | 4/2018 | Chu .................. G06N 7/005 |

OTHER PUBLICATIONS

"Hewlett-Packard Designates Printing A First-Class IoT Security Platform", Retrieved from Internet—http://www.forbes.com/sites/patrickmoorhead/2014/09/29/hewlett-packard-designates-printing-a-first-class-iot-security-platform/#369e23a3065e, Sep. 29, 2014, 7 Pages.

\* cited by examiner

CONTENT DELIVERY NETWORK INCLUDING MOBILE DEVICES

BACKGROUND

A mobile device may be used to transmit content to a printer for printing. For example, a mobile device may be used to create and transmit content directly to a printer. In some cases, a mobile device may transmit content to a server based printing system such that a printer may later pull the content from the server for printing.

BRIEF DESCRIPTION OF THE DRAWINGS

The drawings describe example embodiments. The following detailed description references the drawings, wherein:

FIGS. 1A, 1B, and 1C are block diagrams illustrating computing systems with a content delivery network including mobile devices.

DETAILED DESCRIPTION

In one implementation, a computing system includes a content delivery network of mobile devices communicating with one another via peer to peer connections. The content delivery network may receive content to store and may transmit the stored content to a content delivery device, such as a printer. For example, a PC, laptop, or other electronic device may transmit content to the content delivery network, and content may be available for transmission to a content delivery device from multiple devices within the content delivery network.

As an example, a first mobile device may create or receive content. The first mobile device may encrypt the content if not already encrypted and transmit the content to a second and third mobile device in the content delivery network via peer to peer connections. The first, second, and third mobile may be, for example, a mobile phone, smart watch, and fitness tracker, respectively. A user may transmit content to the content delivery network such that if a user attempts to print and has the fitness tracker available and not the mobile phone or smart watch, the content may be transmitted from the fitness tracker to the printer to render the content.

Using a content delivery network of mobile devices to store content until rendering allows, for example, a user to print to a network held in decentralized nodes. A decentralized content delivery network may improve reliability because there is not a single point of failure. Content transfer may also be faster because the device transmitting content to a content delivery device may transmit directly without involvement of a server. In some cases, a decentralized content delivery network of mobile devices may be more secure because content may be stored as encrypted content on the individual mobile devices, and the content delivery network and/or individual mobile devices within the content delivery network may be associated with a particular user and encryption scheme.

Figure 1A:
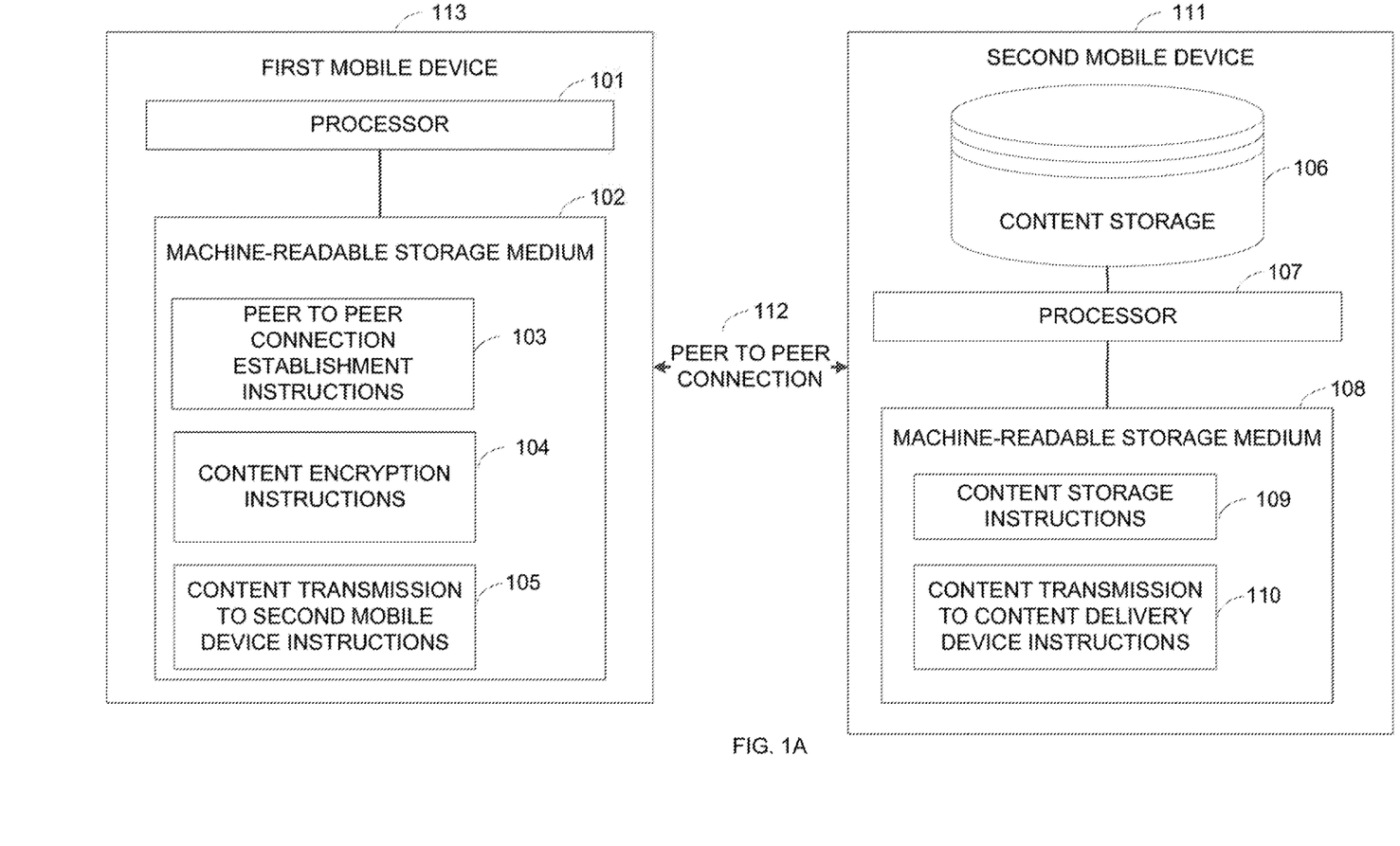
Figure 1B:
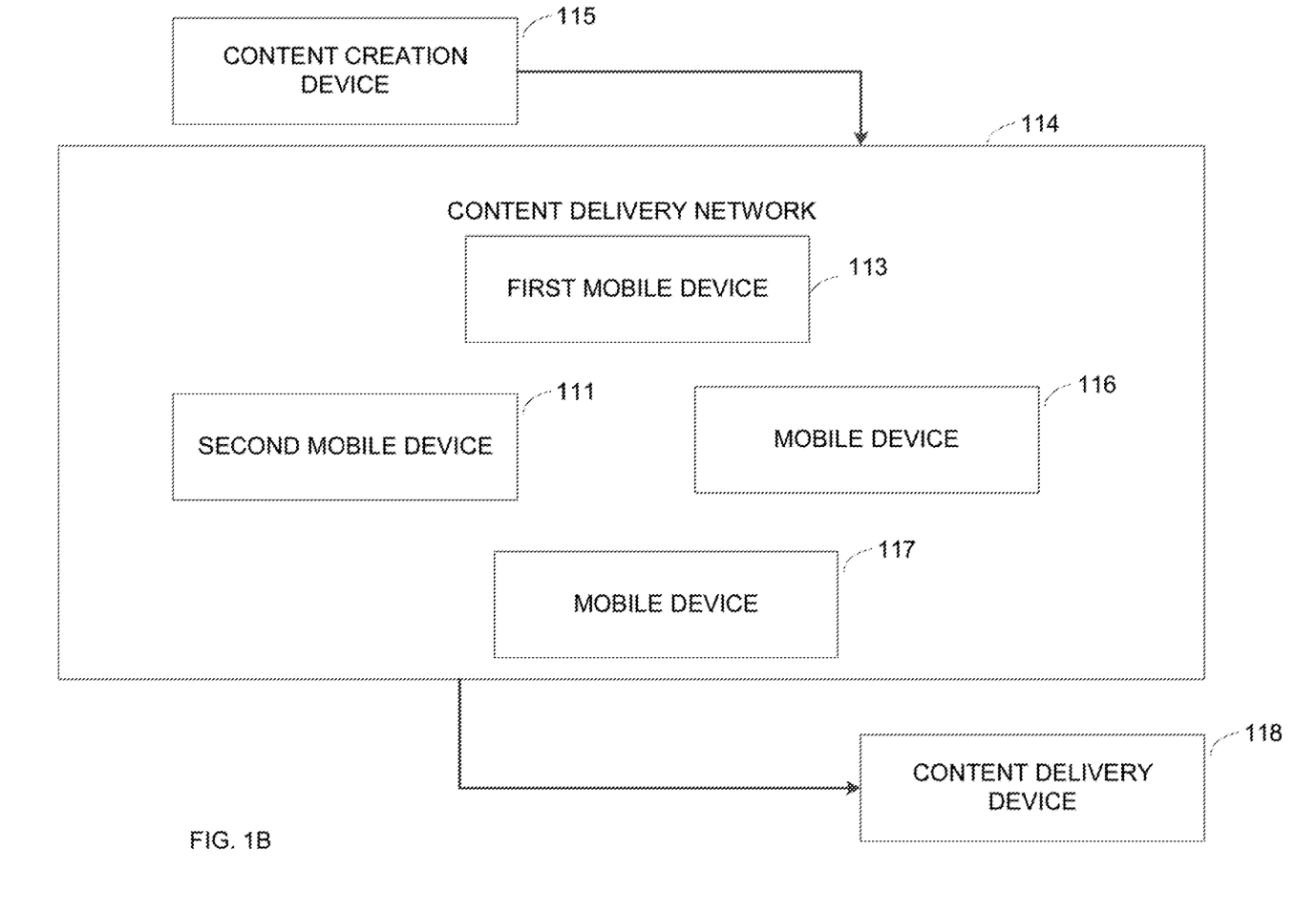

FIGS. 1A, 1B, and 1C are block diagrams illustrating computing systems with a content delivery network including a first and second mobile device. FIG. 1A is a block diagram illustrating one example of a computing system including a content delivery network with a first and second mobile device. The computing system includes a first mobile device 113, second mobile device 111, and a peer to peer connection 112 between the first mobile device 113 and the second mobile device 111. The first mobile device 113 and the second mobile device 111 may form nodes in a decentralized content storage and delivery system. The content delivery network may include any suitable number of mobile devices communicating via peer to peer connections. In one implementation, there are also non-mobile electronic devices, such as PCs or printers, forming part of the content delivery network. The content delivery network may create and/or receive content to be rendered, such as on a printer or display device.

The first mobile device 113 includes a processor 101 and a machine-readable non-transitory storage medium 102. The first mobile device 113 may be any suitable type of mobile device. For example, the mobile device 113 may be an Internet of Things device. The first mobile device 113 may be a mobile phone, smart watch, fitness tracker, appliance, smart home device, or other device capable of receiving and storing data.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include peer to peer connection establishment instructions 103, content encryption instructions 104, and content transmission instructions 105.

The peer to peer connection establishment instructions 103 may include instructions to establish the peer to peer connection 112 between the first mobile device 113 and the second mobile device 111 to create a content delivery network. The peer to peer connection 112 may be initiated in any suitable manner, such as by a user setting up a content delivery network or preparing to deliver a first file. In one implementation, the first mobile device 113, other device on the content delivery network, or an electronic device outside of the content delivery network displays a user interface to allow a user to set up a content delivery network. For example, a user may select which devices to join. In one implementation, a user interface allows a user to add or remove devices from the content delivery network. A device may be removed, such as if it crashes out of the system, and may notify other members of the content delivery network using DHT protocol. When a device is added, a peer to peer connection may be established between the added device and another device in the content delivery network, such as with a coordinating mobile device. In one implementation, an added device establishes a peer to peer connection with multiple devices in the content delivery network. The peer to peer connection 112 may allow the first mobile device 113 and the second mobile device 111 to communicate without server-based communication.

The content encryption instructions 104 includes instructions to encrypt content and/or receive encrypted content. The content may be any suitable content, such as, a text, audio, image, or video file. In one implementation, content is created on an electronic device, such as a PC, laptop, or mobile device, and transmitted to a content delivery network for storage and content rendering. For example, a document may be created on the electronic device and sent to the first mobile device 113. The electronic device may encrypt the content prior to sending to the first mobile device 113. In one implementation, the first mobile device 113 receives the content and encrypts the received content.

In one implementation, the first mobile device 113 creates content. For example, a user of the device may create a text document or picture. The first mobile device 113 may encrypt the created content such that it may be shared within the content delivery network.

The content may be encrypted with any suitable encryption key. For example, the encryption key may be associated with a user, and a set of mobile devices in the content delivery network may be associated with the user. The first mobile device 113 may store encryption information, such as a private key associated with the first mobile device 113 and/or encryption information associated with a user of the content delivery network. The first mobile device 113 may store information related to the content and storage. For example, the first mobile device 113 may store the content, information about the content, information about the location of the content on other devices, and/or encryption information.

The content transmission instructions 105 include instructions to transmit the content to the second mobile device 111 via the peer to peer connection 112. For example, the first mobile device 113 may transmit the encrypted content to multiple devices within the content delivery network. The first mobile device 113 may transmit different segments of the content to different devices within the content delivery network, such as based on storage capacity and other factors. The first mobile device 113 may transmit metadata about the content, such as content name, type, size, and encryption information. In one implementation, the first mobile device 113 transmits the content to the second mobile device 111 and metadata related to the content to a third mobile device in the content delivery network.

The second mobile device 111 may be any suitable mobile device, such as an Internet of Things device. The second mobile device 111 be of the same or different type than the first mobile device 113. The second mobile device 111 may include a storage 106, a processor 107, and a machine-readable storage medium 108.

The storage 106 may be any suitable storage for storing content for the content delivery network. The storage 106 may store, for example, content, encryption information, and/or content metadata. In one implementation, the machine-readable storage medium 108 and the storage 106 are included within the same storage.

The processor 107 may be a central processing unit (CPU), a semiconductor-based microprocessor, or any other device suitable for retrieval and execution of instructions. As an alternative or in addition to fetching, decoding, and executing instructions, the processor 107 may include one or more integrated circuits (ICs) or other electronic circuits that comprise a plurality of electronic components for performing the functionality described below. The functionality described below may be performed by multiple processors.

The processor 107 may communicate with the machine-readable storage medium 108. The machine-readable storage medium 108 may be any suitable machine readable medium, such as an electronic, magnetic, optical, or other physical storage device that stores executable instructions or other data (e.g., a hard disk drive, random access memory, flash memory, etc.). The machine-readable storage medium 108 may be, for example, a computer readable non-transitory medium. The machine-readable storage medium 108 may include content storage instructions 109 and content transmission to content delivery device instructions 110.

The content storage instructions 109 may include instructions to store content received from the first mobile device 113 via the peer to peer connection 112. For example, the second mobile device 111 may store received encrypted content in the storage 106. In one implementation, both the first mobile device 113 and the second mobile device 111 store the content to create storage redundancy and allow the content to be rendered from multiple devices based on the availability of the different devices at the time of rendering.

The content transmission to content delivery device instructions 110 may include instructions to transmit content stored in the storage 106 to a content delivery device. The content delivery device may be any suitable content delivery device, such as a printer, 3D printer, scanner, 3D scanner, multi-functional printing device, display, audio player, or other device that may output content. The second mobile device 111 and/or the content delivery device may decrypt the content for rendering.

FIG. 1B is a block diagram illustrating one example of a computing system to deliver content to a content delivery network and from the content delivery network to a content delivery device. FIG. 1B shows a content delivery network 114, including the first mobile device 113 of FIG. 1A, the second mobile device 111 of FIG. 1A, a mobile device 116, and mobile device 117.

A content creation device 115 may be any suitable device for creating content. In one implementation, the content creation device 115 is part of the content delivery network 114. The content creation device 115 may be a laptop, mobile device, camera, or other device to create content. The content may be, for example, a document or image. In some cases, the content is created by multiple devices.

The content creation device 115 may transmit the content generated to the content delivery network 114. In one implementation, the first mobile device 113 acts as a coordinating device to receive and distribute the content to the other devices in the content delivery network 114. In one implementation, multiple devices act as coordinating devices.

A device in the content delivery network 114 may transmit the content to the content delivery device 118. The content delivery device 118 may be any suitable content delivery device, such as a printer, display device, or audio device. The device within the content delivery network 114 that transmits the content to the content delivery device 118 may be selected based on availability to a user at the time of rendering and/or proximity to the content delivery device 118.

FIG. 1C is a block diagram illustrating one example of a computing system to deliver content from a content delivery network to content delivery devices. For example, the first mobile device 113 from FIG. 1A, second mobile device 111 from FIG. 1A, and mobile device 120 may be members of a content delivery network and may each receive content transmitted to the content delivery network. For example, the first mobile device 113 may generate or receive content and distribute it to the second mobile device 111 and the mobile device 120. The content may be stored on the first mobile device 113, second mobile device 111, and mobile device 120 such that any of the three devices may be used to transmit the content to a content delivery device. For example, a user may have the first mobile device 113 available when transmitting content to the content delivery device 123, the second mobile device 111 available when transmitting content to the content delivery device 121, and the mobile device 120 available when transmitting content to the content delivery device 122. A user may initiate content delivery based on user input to the particular device of the content delivery network to transmit the content to the associated content delivery device.

Figure 2:
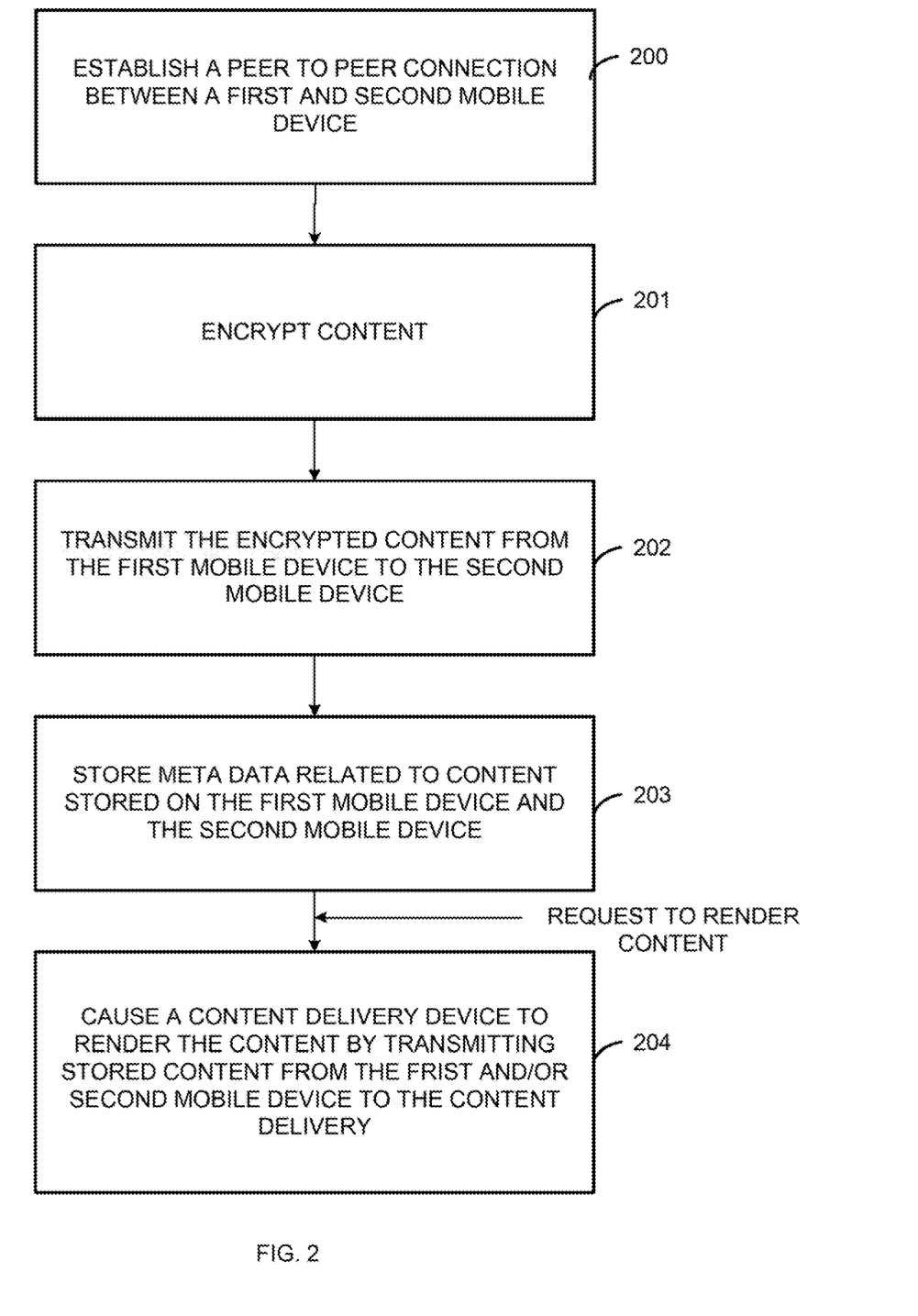
FIG. 2 is a flow chart illustrating one example of a method to create a content delivery network including mobile devices.

FIG. 2 is a flow chart illustrating one example of a method to create a content delivery network including mobile devices. The content delivery network may include multiple mobile devices. Content may be created by or received by a device within the content delivery network. Encrypted content may be stored on multiple devices within the content delivery network to provide multiple options for transmitting the stored content to be transmitted to a content delivery device for rendering. For example, the content may be rendered on an audio, display, or printing device. The method may be implemented, for example, by the computing systems of FIGS. 1A, 1B, and 1C.

Beginning at 200, a first mobile device establishes a peer to peer connection between a first and second mobile device to create a content delivery network. The first and second mobile devices may be any suitable types of mobile device, such as a mobile phone or Internet of Things device. The first mobile device and the second mobile device may have Wireless or other network connectivity. The peer to peer connection may be added when a new device is added to the content delivery network and/or when a content delivery network is established, such as based on user input to a user interface of a member device of the content delivery network or to another device.

Continuing to 201, the first mobile device encrypts content and/or receives encrypted content. The content may be any suitable content, such as an audio, image, and/or document file. The first mobile device and/or second mobile device may receive content from another electronic device that is outside of the content delivery network and/or content created on a member device of the content delivery network.

The first mobile device may verify received content, such as based on a password, biometrics, or other information related to a user transmitting content to the content delivery network. In one implementation, a device that transmits content to the content delivery network encrypts the content with a private key and each member device of the content delivery network has an associated public key.

The first mobile device may encrypt the content in any suitable manner. In one implementation, the first mobile device encrypts the content and then signs both the encrypted content and metadata associated with the encrypted content using a keyed-hashed message authentication code (HMAC) or an encryption key associated with a user. For example, a user may be associated with the content delivery network.

Encryption information may be distributed to the devices in the content delivery network using a previously established secure channel. In one implementation, the device public keys are known by the member devices of the content delivery network and are used to encrypt content received by the content delivery network.

In some cases, an encrypted bundle is distributed to the member devices of the content delivery network, and the bundle includes key and metadata information related to a set of content stored in the content delivery network. For example, encryption information may be transmitted to member devices, including devices with lower storage capacity and unable to store associated content for rendering. Encryption information may be distributed in any suitable manner, such as a using a secure channel with a secret or a known public key. The secure channel may be established between member devices in close proximity of one another.

In one implementation, the content delivery network encrypts content for storage on some devices but not on others. For example, some devices may be associated with a user and classified as trusted devices such that encryption is not used. Content may be encrypted prior to transmitting to untrusted devices.

In one implementation, the content delivery network communicates with an untrusted storage. A encrypted bundle may be stored on an untrusted device such that the untrusted device is unable to decrypt the bundle. The encrypted bundle may include any suitable information, such as content and/or metadata. An untrusted device may be used to store encrypted content such that the untrusted device does not have associated decryption information. As an example, the content delivery network may communicate with server based storage to replicate storage or to provide storage for larger content.

In one implementation, some devices within the content delivery network may be associated with a higher level of trust such that content is encrypted in transmit between the trusted devices, but not while stored on the devices themselves. In one implementation, a mobile device may encrypt content for storage using an encryption scheme associated with the particular device and encrypt the content for transit using a shared encryption scheme.

Continuing to 202, the first mobile device transmits the encrypted content from the first mobile device to the second mobile device. For example, the first mobile device may transmit encrypted content to other members of the content delivery network. The first mobile device may transmit metadata and/or content to the member devices. The first mobile device may determine which devices to transmit the content to and which segments or metadata to transmit based on criteria such as device capacity, device type, previous device usage, and user preference. The first mobile device may select priority or more powerful mobile devices to store content. The first mobile device may determine how many devices to transmit the content to for storage replication based on likelihood of the mobile devices within the content delivery network to crash. The first mobile device may access stored policy information related to how many devices should receive the content, which devices to select, and other information. In one implementation, the content is distributed to member devices, and the content may be distributed to additional member devices if a message is received that one of the storing mobile devices left the system, such as based on a user removing the mobile device or based on a message that the mobile device crashed out of the system.

In one implementation, the first mobile device transmits the content to the second mobile device, and the second mobile device determines whether and where to transmit the content to another mobile device. The first mobile device may store the content for later distribution. In one implementation, the first mobile device transmits the content to a select group of powerful nodes within the content delivery network such that the receiving mobile devices may later distribute the content further.

Continuing to 203, the first mobile device stores metadata related to content stored on the first mobile device and the second mobile device. For example, the first mobile device may distribute content and/or both store and distribute content. The metadata may be any suitable metadata, such as related to encryption, the type of content stored, and/or the size of content stored on each mobile device. In one implementation, there are multiple coordinating devices that may distribute content to the mobile devices of the content delivery network and/or store metadata related to distribution of content on the mobile devices of the content delivery network.

In one implementation, a request to render content may be received by a mobile device of the content delivery network. The request to render content may be received in any suitable manner. For example, user input may be provided to a member device of the content delivery network to request that a content segment stored on the content delivery network be rendered on a particular content delivery device. The request may be a push request from a mobile device or a pull request from the content delivery device.

Continuing to 204, the first mobile device causes a content delivery device to render the content by transmitting stored content from the first mobile device and/or facilitate transmission of content from second mobile device to the content delivery. For example, the first mobile device may transmit the stored content or facilitate the content transmission from the second mobile device, such as by sending a request to the second mobile device, sending information about the second mobile device to the content delivery device, and/or transmitting metadata to the second mobile device or content delivery device. The first mobile device may receive information about how to send content, such as information about a printer driver associated with the content delivery device. The first mobile device may decrypt content prior to sending to the content delivery device. In one implementation, information may be sent to the content delivery device to allow the content delivery device to decrypt received content.

The content delivery device may be any suitable content delivery device, such as a scanner, audio, display, and/or printing device. The content delivery device may be a 3D printer, multi-functional printer, or 3D scanning device. The first mobile device may communicate the content the content delivery device in any suitable manner, such as using Wireless, BLE, or NFC. In one implementation, the first device transmits information to the content delivery device, and the content delivery device then retrieves the content. As an example, the coordinating mobile device may transmit metadata and encryption key information. In one implementation, the content delivery device may not be on the same network as the devices of the content delivery network. A mobile device may send encrypted content over a Wireless network and may establish a secure communication channel with the content delivery device to share encryption key information.

In one implementation where a mobile device stores both the content and associated information, a user may select a content segment, such as a file, to render on a display associated with the content delivery device. A member device of the content delivery network and or the content delivery device may decrypt the encrypted bundle including the content, key, and/or metadata. A driver, such as a print driver, on the member device may create a content type capable of being rendered by the content delivery device. For example, the member mobile device may create a pm file based on print driver information associated with the particular content delivery device. The member mobile device may encrypt the pm file or other content type prior to sending the content delivery device. The encryption information may be the same as associated with the content delivery network or may be associated with the particular content delivery device. As an example, the content delivery device may be a printer, and the mobile device may wrap an encrypted prn file with Print Job Language commands. The wrapped pm file may be transmitted by the mobile device to the content delivery device using Wireless or other network connectivity. The printer may process the information based on the Print Job Language commands and verify and decrypt the associated content. The printer may submit the decrypted content to the print pipeline. The printer may automatically print the content and/or display information about the printable content to allow a user to select the content to print.

In one implementation, a mobile device member of the content delivery device may store metadata and encryption information but not the content itself. For example, the mobile device may transmit information about available content to the content delivery device, and the content delivery device may display information about available content for rendering. The mobile device may communicate with the content delivery device using a secure channel. The mobile device may communicate encryption key information to the content delivery device. In one implementation, the content delivery device sends device information to the mobile device, such as print driver information. The mobile device may transmit the delivery information, such as print driver information, to another mobile device in the content delivery network that may update the content and transmit to the content delivery device. In one implementation, the mobile device requests the content from another mobile device in the content delivery network, and the mobile device transmits the content to the content delivery device. For example, a device more readily available to the user, but with less storage capacity may be used to coordinate the content rendering with a more powerful mobile device member of the content delivery network.

FIGS. 3A-3D are block diagrams illustrating content delivery scenarios related to a content delivery network including mobile devices. FIGS. 3A-3D illustrate content as a document, a content delivery device as a printer, and the content delivery network including a mobile phone and smart watch. Other types of devices and content may apply in a similar manner.

Figure 3A:
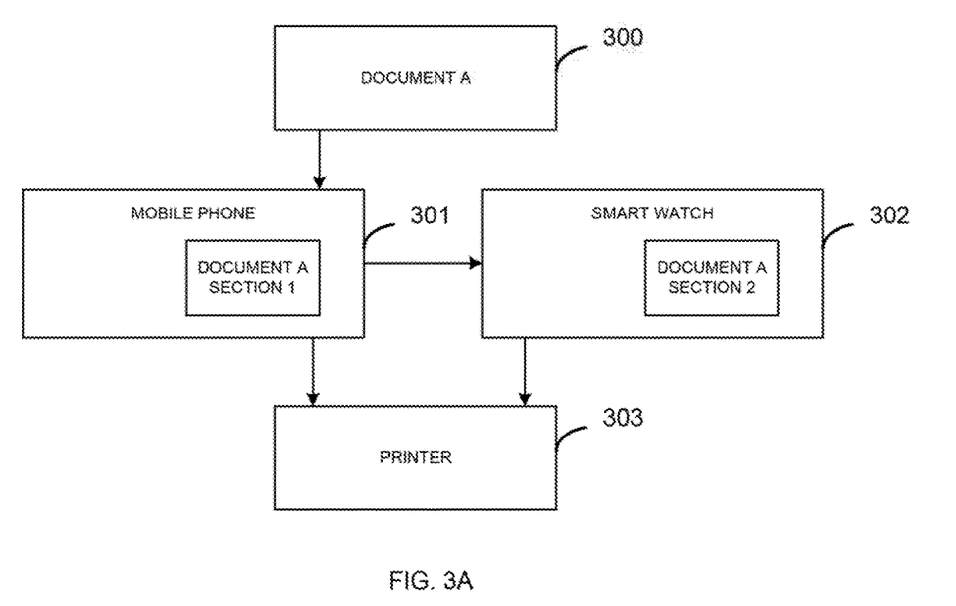
FIGS. 3A-3D are block diagrams illustrating content delivery scenarios related to a content delivery network including mobile devices.

FIG. 3A shows a document A 300 that is transmitted to a content delivery network including mobile phone 301 and smart watch 302. Document A is initially sent to mobile phone 301, and the mobile phone 301 transmits Document A to smart watch 302. A copy of Document A is stored on both the mobile phone 301 and the smart watch 302. The Document A may be transmitted to printer 303 by the mobile phone 301 and/or the smart watch 302. Replicating the storage on both devices may provide a user more options as to where to print the document A 300 from, such as based on whether access to the mobile phone 301 or the smart watch 302 is more convenient at the time of printing. The replication may also provide redundant storage in case of a failure in the content delivery network.

Figure 3B:
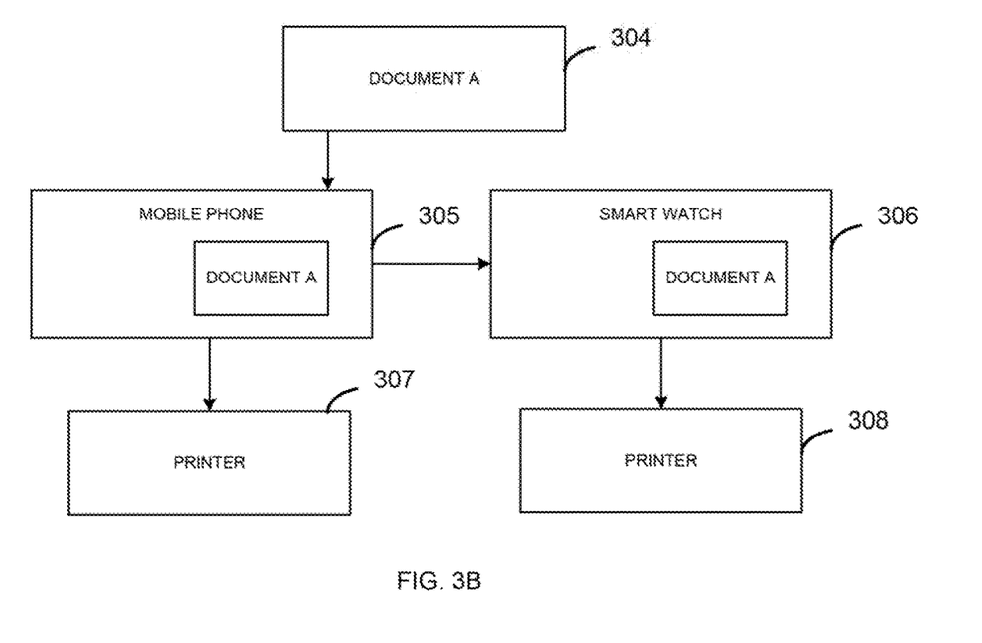

FIG. 3B shows a document A 304, a content delivery network including mobile phone 305 and smart watch 306, and content delivery devices including printer 307 and printer 308. For example, the document A 304 may be received by the mobile phone 305, and the mobile phone 305 may transmit the document A 304 to the smart watch 306. The mobile phone 305 and the smart watch 306 may store the document A 304 independently such that a user may initiative a print command from either device, depending on which device is available or more readily convenient. FIG. 3B shows that document A 304 is printed on printer 307 from the mobile phone 305, and the same document A 304 is printed on printer 308 from the smart watch 306.

Figure 3C:
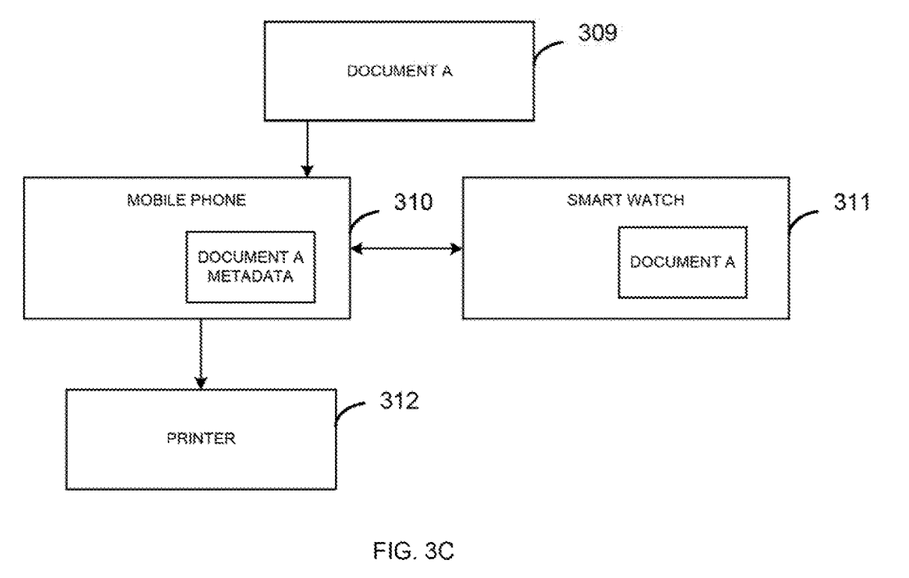

FIG. 3C is a block diagram of a computing system including a document A 309, a mobile phone 301, a smart watch 311, and a printer 312. The mobile phone 301 may coordinate storage of document A on the content delivery network, and the mobile phone 301 may store metadata related to the storage. The metadata may include, for example, information about encryption and storage location. The mobile phone 301 may receive a request to print document A 309. The mobile phone 301 may retrieve metadata related to document A 309 to determine that document A 309 is stored on the smart watch 311. The mobile phone 301 may retrieve document A 309 from the smart watch 311, transmit a request to the smart watch 311 for the smart watch 311 to transmit document A 309 to the printer 312, and/or transmit information about smart watch 311 to the printer 312 to allow the printer to request the document A 309 from the smart watch 311.

In one implementation, there may be multiple device members of the content delivery network that store metadata related to stored items on the content delivery network. For example, smart glasses and a fitness tracker may each hold information about a job name and an encryption key. The storage capacity of the device may be too small to store some content but large enough to store metadata of larger content.

Figure 3D:
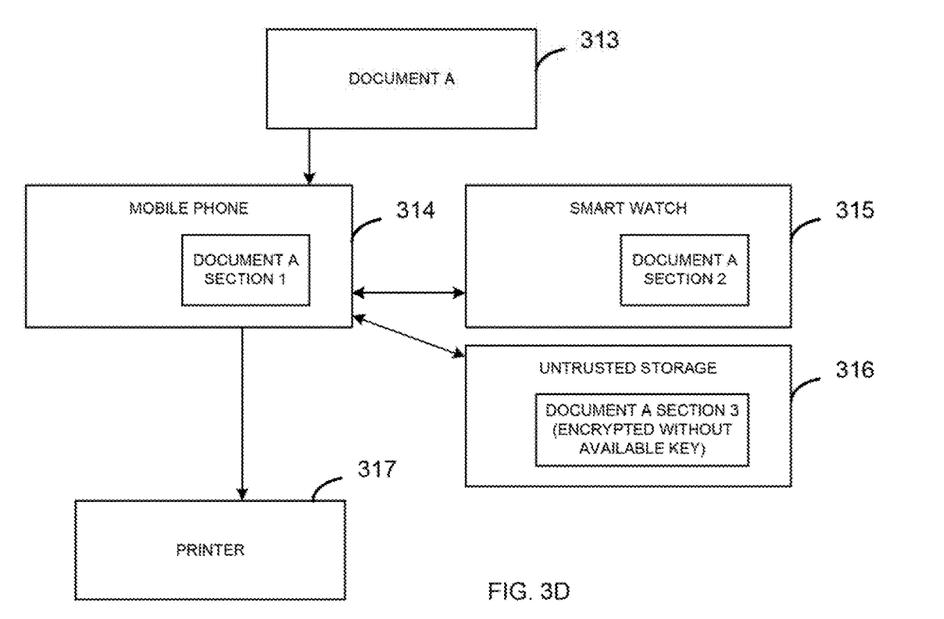

FIG. 3D is a block diagram illustrating one example of a computing system including a content delivery network. FIG. 3D includes a document A 313, a content delivery network including a mobile phone 314 and a smart watch 315, an untrusted storage 316, and a printer 317. In one implementation, content received by the content delivery network is divided into segments, and the different segments are stored on different devices. For example, a coordinating mobile device may segment content and determine where to store the content based on information about member devices of the content delivery network, such as the available storage capacity.

The mobile phone 314 may receive and/or generate document A 313. The mobile phone 314 may compare the storage requirements for document A 313 to available storage capacity of devices in the content delivery network. Other features of the devices may also be considered, such as user preference. The mobile phone 314 stores a first section on the mobile phone 314, and transmits a second segment to the smart watch 315.

In one implementation, the content delivery network may communicate with untrusted storage, such as untrusted storage 316. The untrusted storage may be a public device or a storage device associate with a different user. A member device of the content delivery network may transmit encrypted content to the untrusted storage to storage such that encryption key information is unavailable to the untrusted storage. The untrusted storage may store a segment of the content or the entire content.

The mobile device 314 may retrieve the content segments from the other devices when a request to print document A 313 on printer 317 is received. In one implementation, the mobile device 314 or another device receives a request to print document A on printer 317, and the mobile device 314 sends a command to each of the devices storing segments of document A 313 such that the devices individually transmit the segments to the printer 317. In one implementation, the mobile device 314 transmits information to the printer 317 about the mobile devices storing relevant content such that the printer 317 may initiate a request to the mobile devices. A content delivery network may provide a more convenient and secure method of storing content for delivery to a content delivery device.

The invention claimed is:

1. A computing system, comprising:
    a first mobile device, comprising a processor to:
        establish a peer to peer connection with a second mobile device such that the first mobile device and the second mobile device to create a content delivery network;
        perform at least one of: receive encrypted content and encrypt content;
        store a first segment of the encrypted content on the first mobile device;
        transmit a second segment of the encrypted content to the second mobile device for storage on the second mobile device; and
        cause transmission of the first segment and the second segment to a content delivery device in response to a request to render content to cause the content delivery device to render a decrypted version of the encrypted content.

2. The computing system of claim 1, comprising a third mobile device, wherein the processor of the first mobile device is further to:
    transmit, via a peer to peer connection, the encrypted content to a third mobile device in the content delivery network,
    wherein the content delivery device may receive the content from the third mobile device.

3. The computing system of claim 1, wherein the content delivery device is at least one of a printer, 3D printer, display device, and audio device.

4. The computing system of claim 1, further comprising a content generating device to transmit the content to the first mobile device, wherein the content generating device does not comprise a mobile device and wherein the first and second mobile devices comprise Internet of Things devices.

5. The computing system of claim 1, wherein the first mobile device is further to transmit content stored on the first mobile device to the content delivery device in response to a request to render content.

6. A method, comprising:
    establishing a peer to peer connection between a first and second mobile device to create a content delivery network;
    performing at least one of encrypting content and receiving encrypted content;
    transmitting, by the first mobile device, at least a portion of the encrypted content to the second mobile device;
    storing the encrypted content on at least one of the first and second mobile devices in the content delivery network;
    storing, by the first mobile device, encryption key information and storage metadata information;
    decrypting the content;
    receiving, by the first mobile device, a request to render content; and
    in response to the request to render content:
        requesting, by the first mobile device, the content based on the stored metadata information, and transmitting, by at least one of the devices in the content delivery network, the content to cause a content delivery device to render the decrypted content.

7. The method of claim 6, further comprising:
determining a first segment of the content to store on the first mobile device and a second segment of the content to store on the second mobile device;
transmitting, by the first mobile device, the second segment of the content to the second mobile device;
in response to the request to render content, transmitting the first segment of content and the second segment of content to the content delivery device.

8. The method of claim 6, wherein the request to render content is received by user input provided to the first mobile device.

9. The method of claim 6, further comprising storing, by a third mobile device, metadata related to the stored content in the content delivery network.

10. The method of claim 6, wherein encrypting content comprises encrypting content with an encryption key associated with a user and wherein the first mobile device is associated with the user.

11. The method of claim 6, further comprising:
transmitting the encrypted content to an untrusted storage without access to an associated encryption key; and
retrieving the content from the untrusted storage in response to the request to render content.

12. A machine-readable non-transitory storage medium comprising instructions executable by a processor of a first mobile device to:
establish a peer to peer connection with a second mobile device to create a content delivery network;
encrypt content;
transmit a first segment of the encrypted content to the second mobile device and transmit a second segment of the encrypted content to a third mobile device based on at least one of storage parameters, availability, processing power, security, and stored policy information;
store metadata related to content stored on the first mobile device and content stored on the second mobile device; and
in response to a request to render content on a content delivery device, cause the content delivery device to render the content by performing at least one of: transmitting stored content from the first mobile device and coordinating transmission of the content from the second mobile device to the content delivery device.

13. The machine-readable non-transitory storage medium of claim 12, wherein instructions to encrypt the content comprise instructions to encrypt the content using an encryption key associated with a user of the first mobile device and the second mobile device.

* * * * *